3,170,954
PERFLUOROISOPROPYLSULFUR(IV) FLUORIDES
Richard M. Rosenberg, Wilmington, Del., assignor to
E. I. du Pont de Nemours and Company, Wilmington,
Del., a corporation of Delaware
No Drawing. Filed June 16, 1961, Ser. No. 117,513
12 Claims. (Cl. 260—543)

This invention relates to new organic-substituted sulfur fluorides and to a process for preparing these compounds.

Some fluoroalkyl derivatives of higher valent sulfur fluorides, i.e., fluoroalkyl derivatives of sulfur tetrafluoride and sulfur hexafluoride, have become available through the energetic fluorination of materials such as carbon disulfide, alkyl sulfides, or alkyl mercaptans. However, these fluorination processes primarily yield derivatives of sulfur hexafluoride and produce little or none of the corresponding derivatives of sulfur tetrafluoride. Furthermore, up to now, only straight-chain perfluoroalkylsulfur(IV) fluorides have been obtained by such methods.

More recently, a process has appeared for the preparation of β-alkoxyperfluoroethylsulfur trifluorides by reaction of sulfur tetrafluoride with alkyl trifluorovinyl ethers, but this process is specific to these ethers. Accordingly, new perfluoroisopropylsulfur(IV) fluorides are characfluorides in which the sulfur is tetravalent.

It has now been discovered that previously unknown perfluoroisopropylsulfur(IV) fluorides can be prepared from perfluoropropylene and sulfur(IV) fluorides. The new perfluoroisopropylsulfur (IV) fluorides are characterized by the perfluoroisopropylsulfur group, in which the sulfur is tetravalent and is bonded to at least two fluorine atoms, the remaining sulfur valence being satisfied by fluorine, a haloalkyl group, a β-alkoxyperfluoroethyl group or an aryl group.

The compounds of the invention are of the formula:

$$CF_3-CF-SF_2-A$$
$$\quad |$$
$$\quad CF_3$$

wherein A is fluorine, β-alkoxyperfluoroethyl of up to 18 carbons, aliphatically saturated aromatic hydrocarbyl of 6–18 carbons and up to 2 aromatic rings, or α-fluorohaloalkyl of up to 18 carbons in which all halogens are of atomic number 9–17 (chlorine and fluorine), i.e., the α-fluoro atom may be the only halogen present, any additional halogen being chlorine and/or fluorine. The preferred compounds are those in which A is fluorine, aromatic hydrocarbyl of 6–12 carbons or perfluoroalkyl of 1–12 carbons.

These perfluoroisopropylsulfur(IV) fluorides are obtained by reacting perfluoropropylene with a sulfur(IV) fluoride of the formula $ASF_3$, where A is defined as above, in the presence of cesium fluoride at a temperature of 0–0200° C. The process is illustrated by the equation:

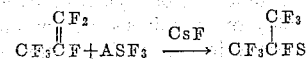

$$CF_3CF=CF_2 + ASF_3 \xrightarrow{CsF} CF_3CFSF_2A$$

The mechanism of the above-illustrated reaction is unknown, but is has been determined that the reaction does not take place in the absence of cesium fluoride under conditions hereinafter described.

In the process of the invention, the reaction is accomplished at 0° to 200° C., e.g., in a closed reaction vessel under the autogenous pressure of the reactants. The cesium fluoride catalyst and relatively non-volatile reactants are placed in the open vessel and the vessel is then closed, cooled and evacuated. Highly volatile reactants, e.g., perfluoropropylene and sulfur tetrafluoride, are introduced into the cooled, evacuated reactor by gaseous transfer. In addition to the reactants, inert gaseous or liquid diluents can be used, if desired. Heating the mixture to reaction temperature can be accomplished by a procedure wherein the temperature is held for short periods of time at intermediate levels. This stepwise heating procedure permits smooth operation and avoids sudden increase in the reaction pressure, but such a procedure is not necessary and the reactants can, if desired, be heated to the reaction temperature in a single step.

The temperature of the reaction can be in the range of 0° to 200° C., though it is preferred to use a temperature in the range of 50° to 175° C., and it is especially preferred to use a temperature in the range of 75° to 150° C. Although temperatures above 200° C. can be used, it is advantageous not to exceed about 200° C. because of the onset of decomposition reactions that reduce yields and introduce contaminants.

Reaction pressure is not a critical factor in the process. It is most convenient to conduct the reaction under autogenous pressure which is usually in the range of about 2 to 200 atmospheres, but lower or higher pressures can be used if desired.

Anhydrous conditions are assured because sulfur tetrafluoride and organosulfur trifluorides in general are strongly reactive with water. Although the products of hydrolysis do not affect the reaction of perfluoropropylene and the tetravalent sulfur fluorides described above, it is advantageous to use substantially anhydrous perfluoropropylene and cesium fluoride to avoid wasteful use of the sulfur fluoride raw materials and adventitious formation of undesirable by-products.

The molar proportions of the reactants are not critical since excess starting materials can be recovered unchanged. However, in the reaction of perfluoropropylene and sulfur tetrafluoride illustrated by the equations:

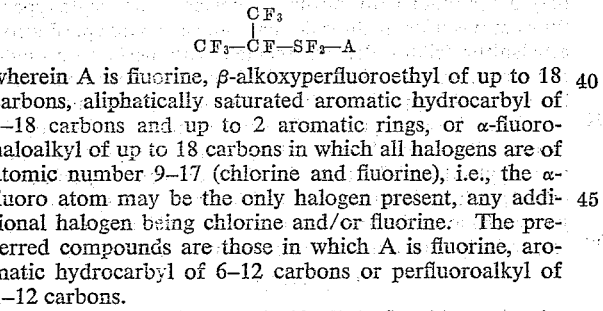

(a) $$CF_3CF=CF_2 + SF_4 \xrightarrow{CsF} CF_3CFSF_3$$
perfluoroisopropylsulfur trifluoride (b) $$2CF_3CF=CF_2 + SF_4 \xrightarrow{CsF} CF_3CFSF_2CFCF_3$$
$$\qquad\qquad\qquad\qquad\qquad\qquad\quad |\qquad\ |$$
$$\qquad\qquad\qquad\qquad\qquad\qquad CF_3\ \ CF_3$$
bis(perfluoroisopropyl)
sulfur difluoride the relative proportions of the two products, perfluoroisopropylsulfur trifluoride and bis(perfluoroisopropyl)sulfur difluoride, are subject to the law of mass action, i.e., an excess of sulfur tetrafluoride will encourage formation of perfluoroisopropylsulfur trifluoride and an excess of perfluoropropylene will encourage formation of bis(perfluoroisopropyl)sulfur difluoride. For economy of operation, it is preferred to use molar ratios of perfluoropropylene to the $ASF_3$ reactant in the range of 5:1 to 1:5.

Isolation and purification of the product is readily accomplished by conventional procedures, e.g., by fractional distillation of the reaction mixture in an efficient fractionating column.

The material of which the reaction vessel is constructed is not critical in the process, but it is advantageous to use a vessel which is resistant to attack by components of the reaction mixture. Suitable reaction vessels can be made of stainless steel, nickel, "Monel" or nickel-iron-molybdenum alloys.

The invention is illustrated in greater detail in the following examples wherein the reactions were conducted under anhydrous conditions. Example I constitutes a preferred embodiment of the invention.

EXAMPLE I

*Perfluoroisopropylsulfur trifluoride and bis(perfluoroisopropyl)sulfur difluoride*

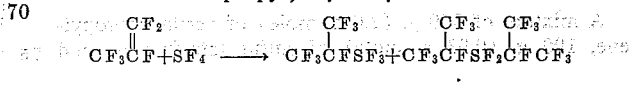

$$CF_3CF=CF_2 + SF_4 \longrightarrow CF_3CFSF_3 + CF_3CFSF_2CFCF_3$$

A mixture of 60 g. (0.40 g. mole) of perfluoropropylene, 45 g. (0.42 g. mole) of sulfur tetrafluoride and 3.6 g. (0.024 g. mole) of anhydrous cesium fluoride was held under autogenous pressure in a 240 ml. pressure vessel, constructed of a nickel-iron-molybdenum alloy, at room temperature for 2 hours and was then heated at 100° C. for 2 hours and 150° C. for 10 hours. The mixture in the pressure vessel was cooled to 0° C. and volatile material was removed at this temperature by vacuum transfer. Twenty grams of yellow, residual liquid remained in the pressure vessel.

Distillation of the volatile material yielded 30 g. of colorless liquid, B.P. 46 to 47° C., which was identified as perfluoroisopropylsulfur trifluoride by nuclear magnetic resonance and elemental analysis.

Analysis for $C_3F_{10}S$:

|  | C | S | F | Mol. Wt. |
|---|---|---|---|---|
| Calc'd | 14.0 | 12.4 | 73.6 | 258 |
| Found | 14.6 | 12.5 | 73.4 | 261 |

Distillation of the yellow residual liquid yielded two fractions. The first fraction, which weighed 0.95 g. and boiled at 39–42° C., was identified as perfluoroisopropylsulfinyl fluoride by nuclear magnetic resonance and elemental analysis. This product was probably formed by adventitious hydrolysis of perfluoroisopropylsulfur trifluoride.

Analysis for $C_3F_8OS$:

|  | C | S | F |
|---|---|---|---|
| Calc'd | 15.3 | 13.6 | 64.4 |
| Found | 15.5 | 14.1 | 64.5 |

The second fraction, which weighed 8.6 g. and boiled at 95° C. at 473 mm. pressure, was identified as bis(perfluoroisopropyl)sulfur difluoride by nuclear magnetic resonance and elemental analysis.

Analysis for $C_6F_{16}S$:

|  | C | S | F |
|---|---|---|---|
| Calc'd | 17.7 | 7.85 | 74.5 |
| Found | 18.1 | 7.94 | 74.6 |

Perfluoroisopropylsulfur trifluoride is a colorless, volatile liquid having a very penetrating odor and a toxicity similar to that of phosgene. It is readily soluble in most of the common organic solvents, and it reacts vigorously with hydroxylated solvents such as ethanol. However, it is resistant to hydrolysis, showing negligible reaction with water in 45 minutes at room temperature and incomplete reaction in 24 hours. In the presence of a mutual solvent such as acetonitrile, the trifluoride reacts mildly with water to form the corresponding sulfinic acid $$(CF_3)_2CFSO_2H$$

Bis(perfluoroisopropyl)sulfur difluoride is a colorless, non-toxic liquid which is soluble in ether, acetone and chloroform but only slightly soluble or insoluble in ethanol, methylene chloride, acetonitrile, dimethyl sulfoxide and benzene. It is stable in air and is highly resistant to hydrolysis, showing no decomposition in boiling water and only minor reaction in aqueous KOH at 100° C.

EXAMPLE II

*Perfluoroisopropylsulfur trifluoride and bis-(perfluoroisopropyl)sulfur difluoride*

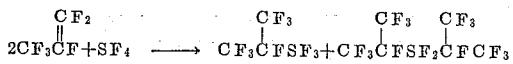

A mixture of 300 g. (2.0 g. mole) of perfluoropropylene, 100 g. (0.93 g. mole) of sulfur tetrafluoride and 14 g. (0.092 g. mole) of anhydrous cesium fluoride, under autogenous pressure in a 1 liter pressure vessel constructed of a nickel-iron-molybdenum alloy, was heated at 100° C. for 5 hours and at 150° C. for 10 hours. The products of the reaction, isolated by the procedure described in Example I, were perfluoroisopropylsulfur trifluoride (6.0 g., 2.5% conversion) and bis(perfluoroisopropyl)sulfur difluoride (314 g., 77% conversion).

EXAMPLE III

*S-(perfluoromethyl)perfluoroisopropylsulfur difluoride*

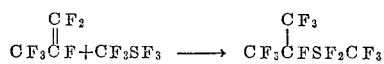

A mixture of 24 g. (0.16 g. mole) of perfluoropropylene, 25 g. (0.16 g. mole) of perfluoromethylsulfur trifluoride and 2.4 g. (0.016 g. mole) of anhydrous cesium fluoride, under autogenous pressure in an 80-ml. pressure vessel constructed of a nickel-iron-molybdenum alloy, was heated at 100° C. for 3 hours and at 150° C. for 7 hours. The reaction vessel was cooled to 0° C. and gaseous products were vented at this temperature. Distillation of the liquid residue yielded 9.8 g. of clear, colorless product, B.P. 70–71° C., which was identified as S-(perfluoromethyl)perfluoroisopropylsulfur difluoride by nuclear magnetic resonance spectrum and elemental analysis.

Analysis for $C_4F_{12}S$:

|  | C | S | F |
|---|---|---|---|
| Calc'd | 15.6 | 10.4 | 74.1 |
| Found | 16.0 | 10.5 | 73.4 |

S-($\beta$ - alkoxyperfluoroethyl)perfluoroisopropyl - sulfur difluorides are readily prepared by substituting the appropriate $\beta$-alkoxyperfluoroethylsulfur trifluorides (prepared in the manner described in U.S. 2,928,870) for perfluoromethylsulfur trifluoride in the process of Example III. Thus, when, e.g., $\beta$-methoxyperfluoroethylsulfur trifluoride, $\beta$-propoxyperfluoroethylsulfur trifluoride, $\beta$-octyloxyperfluoroethylsulfur trifluoride, $\beta$-dodecyloxyperfluoroethylsulfur trifluoride or $\beta$-hexadecyloxyperfluoroethylsulfur trifluoride, are reacted with perfluoropropylene under the conditions recited in the above example, S-($\beta$ - methoxyperfluorethyl)perfluoroisopropylsulfur difluoride, S-($\beta$-propoxyperfluoroethyl)perfluoroisopropylsulfur difluoride, S-($\beta$-octyloxyperfluoroethyl)perfluoroisopropylsulfur difluoride, S - ($\beta$ - dodecyloxyperfluoroethyl)perfluoroisopropylsulfur difluoride or S-($\beta$-hexadecyloxyperfluoroethyl)perfluoroisopropylsulfur difluoride, respectively, are obtained in substantial quantities.

EXAMPLE IV

*S-(phenyl)perfluoroisopropylsulfur difluoride*

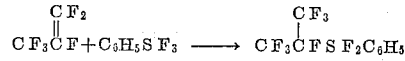

A mixture of 15.0 g. (0.1 g. mole) of perfluoropropylene, 16.6 g. (0.1 g. mole) of phenylsulfur trifluoride and 3.0 g. (0.02 g. mole) of anhydrous cesium fluoride, under autogenous pressure in a 140-ml. pressure vessel constructed of a nickel-iron-molybdenum alloy, was heated successively at 100° C. for 2 hours, at 125° C. for 2 hours, and at 150° C. for 4 hours. A liquid product weighing 28.6 g. was obtained. Distillation of 12.0 g. of this liquid yielded 10.3 g. of colorless distillate, B.P. 46–50° C./0.5–0.7 mm., which was identified as S-(phenyl)perfluoroisopropylsulfur difluoride by infrared, ultraviolet and nuclear magnetic resonance spectra.

Analysis for $C_9H_5F_9S$:

|  | C | H | F | S |
|---|---|---|---|---|
| Calc'd | 34.2 | 1.60 | 54.1 | 10.1 |
| Found | 34.7 | 1.92 | 52.8 | 9.3 |

The sulfur(IV) fluorides used as starting materials in the above examples can be made by known methods: i.e., sulfur tetrafluoride is obtainable from sulfur, chlorine and an alkali metal fluoride by the method of assignee's copending application Serial No. 798,828, now U.S. Patent No. 2,992,073; perfluoromethylsulfur trifluoride is obtainable from carbon disulfide and fluorine by the method of Tyczkowski and Bigelow, J. Am. Chem. Soc. 75, 3523 (1923); and phenylsulfur trifluoride is obtainable from diphenyl disulfiide and silver difluoride by the method of Sheppard, J. Am. Chem. Soc. 82, 4751 (1960).

Other sulfur(IV) fluorides, ASF$_3$, which can be made by the above prior art processes and reacted with perfluoroisopropylene by the process of the invention to produce S-(A)perfluoroisopropylsulfurdifluorides are as follows (the A portion of the reactant, and thus the product, are set forth in brackets following the respective reactants): fluoromethylsulfur trifluoride [CH$_2$F—], difluoromethylsulfur trifluoride [CHF$_2$—], chlorodifluoromethylsulfur trifluoride [CClF$_2$—], perfluorobutylsulfur trifluoride [C$_4$F$_9$—], α-fluoro-n-butylsulfur trifluoride [CH$_3$(CH$_2$)$_2$CHF—], ω-hydroperfluorooctylsulfur trifluoride [CHF$_2$(CF$_2$)$_7$—], perfluorododecylsulfur trifluoride [C$_{12}$F$_{23}$—], ω-chloroperfluorododecylsulfur trifluoride [ClCF$_2$(CF$_2$)$_{11}$—], perfluorooctadecylsulfur trifluoride [CF$_3$(CF$_2$)$_{17}$—], p-tolylsulfur trifluoride [p-CH$_3$C$_6$H$_4$—], p-phenylphenylsulfur trifluoride [p-C$_6$H$_5$—C$_6$H$_4$—], 2,4-dipropylphenylsulfur trifluoride [2,4-(CH$_3$CH$_2$CH$_2$)$_2$C$_6$H$_3$—], 2-naphthylsulfur trifluoride [2-C$_{10}$H$_7$—], and 2-(4,7-di-n-butylnaphthyl)sulfur trifluoride [2-(4,7-[n-C$_4$H$_9$]$_2$C$_{10}$H$_5$)—].

Perfluoroisopropylsulfur(IV) fluorides described in the foregoing examples are surprisingly resistant to hydrolysis, a resistance which is especially strong in the disubstituted sulfur(IV) difluorides. The hydrolytic stability of perfluoroisopropylsulfur trifluoride is unexpected, since organosulfur trifluorides ordinarily react readily with water, viz., perfluoromethylsulfur trifluoride [Tyczkowski and Bigelow, J. Am. Chem. Soc. 75, 3523 (1953)], phenylsulfur trifluoride [Sheppard, J. Am. Chem. Soc. 82, 4751 (1960)].

The tetravalent perfluoroisopropylsulfur fluorides are useful as ionic initiators for polymerization of cyclic ethers, e.g., polymerization of tetrahydrofuran occurs at room temperature in the presence of perfluoroisopropylsulfur trifluoride and the resulting elastomeric product can be used as an adhesive. To illustrate, a clear solution of 10 drops of perfluoroisopropylsulfur trifluoride in 1 ml. of tetrahydrofuran changed, in seventeen hours, to a gummy mass which was completely soluble in 2 ml. of warm tetrahydrofuran, forming a viscous solution from which an elastomeric solid was precipitated by addition of water or methanol. Two glass plates, between which a few drops of the polymer solution were pressed and heated at 110° C. for 15 minutes, were firmly bonded together when the assembly was cooled to room temperature.

The products are also useful as solvents. For example, a 10% solution of low molecular weight tetrafluoroethylene polymer in bis(perfluoroisopropyl)sulfur difluoride was prepared. A piece of filter paper was soaked in the solution and was then dried. The treated paper was not wetted by water, whereas a similar untreated piece of paper was instantaneously wetted when dipped into water.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula:

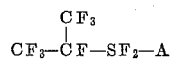

wherein A is of the group consisting of fluorine, α-fluorohaloalkyl of up to 18 carbons in which all halogens are of atomic number 9–17, β-alkoxyperfluoroethyl of up to 18 carbons and aliphatically saturated aromatic hydrocarbyl of 6 to 18 carbons and up to 2 aromatic rings.

2. Perfluoroisopropylsulfur trifluoride.

3. Bis(perfluoroisopropyl)sulfur difluoride.

4. S-(perfluoromethyl)perfluoroisopropylsulfur difluoride.

5. S-(phenyl)perfluoroisopropylsulfur difluoride.

6. A process of preparing perfluoroisopropylsulfur(IV) fluorides which comprises contacting perfluoropropylene with a sulfur(IV) fluoride of the formula ASF$_3$, wherein A is of the group consisting of fluorine, α-fluorohaloalkyl of up to 18 carbons in which all halogens are of atomic number 9–17, β-alkoxyperfluoroethyl of up to 18 carbons and aliphatically saturated aromatic hydrocarbyl of 6 to 18 carbons and up to 2 aromatic rings, in the presence of cesium fluoride, under anhydrous conditions and at a temperature of 0–200° C.

7. The process of claim 6 wherein the reactants are contacted under autogenous pressure at a temperature of 50–175° C.

8. The process of claim 7 wherein the temperature is 75–150° C.

9. The process of claim 7 wherein the molar ratio of perfluoropropylene to ASF$_3$ is in the range of 5:1 to 1:5.

10. The process of claim 7 wherein the sulfur(IV) fluoride is sulfur tetrafluoride.

11. The process of claim 7 wherein the sulfur(IV) fluoride is perfluoromethylsulfur trifluoride.

12. The process of claim 7 wherein the sulfur(IV) fluoride is phenylsulfur trifluoride.

References Cited in the file of this patent

UNITED STATES PATENTS 2,928,870  Hasek _____ Mar. 15, 1960

OTHER REFERENCES

Houben-Weyl: Methoden der Organischen Chemie, vol. 5, part 3 (1962), pp. 84–95.

UNITED STATES PATENT OFFICE
CERTIFICATE OF CORRECTION

Patent No. 3,170,954                        February 23, 1965

Richard M. Rosenberg

It is hereby certified that error appears in the above numbered patent requiring correction and that the said Letters Patent should read as corrected below.

Column 1, lines 25 and 26, strike out "perfluoroisopropylsulfur(IV) fluorides are charac-fluorides" and insert instead -- methods are needed for making fluoroalkylsulfur fluorides --; line 54, for "0-0200° C." read -- 0-200° C. --; column 4, line 34, for "perfluoroisopropyl-sulfur" read -- perfluoroisopropylsulfur --.

Signed and sealed this 27th day of July 1965.

(SEAL)
Attest:

ERNEST W. SWIDER                        EDWARD J. BRENNER
Attesting Officer                        Commissioner of Patents